(12) United States Patent
Choyi et al.

(10) Patent No.: US 8,102,838 B2
(45) Date of Patent: Jan. 24, 2012

(54) MECHANISM FOR AUTHENTICATION OF CALLER AND CALLEE USING OTOACOUSTIC EMISSIONS

(75) Inventors: Vinod Kumar Choyi, Ottawa (CA); Bertrand Marquet, Le Plessis Robinson (FR)

(73) Assignee: Alcatel Lucent, Paris (FR)

( * ) Notice: Subject to any disclaimer, the term of this patent is extended or adjusted under 35 U.S.C. 154(b) by 1408 days.

(21) Appl. No.: 11/653,980

(22) Filed: Jan. 17, 2007

(65) Prior Publication Data
US 2008/0172728 A1    Jul. 17, 2008

(51) Int. Cl.
*H04L 12/66* (2006.01)
(52) U.S. Cl. ........ 370/352; 370/356; 370/339; 370/351; 379/88.02; 382/115
(58) Field of Classification Search .......... 370/351–356; 379/88.02
See application file for complete search history.

(56) References Cited

U.S. PATENT DOCUMENTS

| | | | |
|---|---|---|---|
| 5,787,187 A | 7/1998 | Bouchard | |
| 6,219,793 B1 | 4/2001 | Li et al. | |
| 6,607,136 B1 * | 8/2003 | Atsmon et al. | 235/492 |
| 2003/0123619 A1 * | 7/2003 | McKinnon et al. | 379/88.02 |
| 2005/0050090 A1 * | 3/2005 | Kawahata et al. | 707/103 Y |
| 2005/0076246 A1 * | 4/2005 | Singhal | 713/201 |
| 2005/0249197 A1 * | 11/2005 | Fang | 370/352 |
| 2005/0251681 A1 * | 11/2005 | Robles et al. | 713/172 |
| 2006/0026288 A1 | 2/2006 | Acharya et al. | |
| 2006/0029190 A1 * | 2/2006 | Schultz | 379/88.01 |
| 2006/0072523 A1 * | 4/2006 | Richardson et al. | 370/338 |
| 2006/0107310 A1 * | 5/2006 | Schmid et al. | 726/4 |
| 2007/0201443 A1 * | 8/2007 | Saha et al. | 370/356 |
| 2008/0010674 A1 * | 1/2008 | Lee | 726/7 |
| 2008/0095327 A1 * | 4/2008 | Wlasiuk | 379/88.01 |
| 2008/0181140 A1 * | 7/2008 | Bangor et al. | 370/261 |

FOREIGN PATENT DOCUMENTS

WO    02091310 A1    11/2002

OTHER PUBLICATIONS

Swabey, et al., Using Otoacoustic Emissions as a Biometric, pp. 1-7, United Kingdom.
Rosenberg, et al., SIP: Session Initiation Protocol, Network Working Group, AT&T, Jun. 2002.

* cited by examiner

*Primary Examiner* — Ian N Moore
*Assistant Examiner* — Khaled Kassim
(74) *Attorney, Agent, or Firm* — Kramer & Amado P.C.

(57) ABSTRACT

A method and apparatus are provided for authenticating a user attempting to establish a service which uses SIP. The user registers with the SIP server by providing the digital otoacoustic signature of the user. Thereafter, when the user attempts to initiate a session through the SIP server, the SIP server sends an Authorization Request message to the SIP client of the user. The SIP client reads the user's digital otoacoustic signature, generates a response based on the digital otoacoustic signature, and embeds the response in a second Invite message sent back to the SIP server. Meanwhile, the SIP server determines an expected response, based on the digital otoacoustic signature registered by the user. If the response provided by the SIP client matches the response expected by the SIP server, the SIP server allows establishment of the server. The invention is of particular use with IP telephony services, since end user devices used with such services are ergonomically well suited for reading of otoacoustic signatures. The invention may also be used to authenticate an intended recipient of an SIP call.

20 Claims, 3 Drawing Sheets

MECHANISM FOR AUTHENTICATION OF CALLER AND CALLEE USING OTOACOUSTIC EMISSIONS

FIELD OF THE INVENTION

The invention relates to user authentication for Internet telephony services, and more particularly to biometric authentication of users of such services.

BACKGROUND OF THE INVENTION

The Session Initiation Protocol (Rosenberg et al., "SIP: Session Initiation Protocol", IETF RFC 3261, June 2002) is used to establish multimedia sessions, such as Internet telephony sessions. SIP includes a user authentication scheme in which an SIP Client sends an Invite message to an SIP Server. The SIP Server sends a challenge message back to the SIP Client, for example in the form of a 401 Authorization Required message. The challenge message includes a nonce generated by the SIP Server. The SIP Client computes a response, and sends a second Invite message back to the SIP Server, the second Invite message including the original nonce and the response. The SIP Server compares the transmitted response with an expected response calculated by the SIP Server. If the transmitted response (sent by the SIP Client) matches the expected response, then the caller is authenticated and the SIP Server proceeds to with establishment of the service requested by the user. Such an authentication scheme works if the SIP Client and the SIP Server calculate the response from the nonce using the same algorithm and the same parameters, such as a shared encryption key.

Otoacoustic signatures provide a biometric identification of an individual. The otoacoustic signature of an individual can be determined by transmitting a series of clicks into an individual's ear canal. The echo of these clicks within the ear canal is detected by a microphone. The detected echo is digitized to produce a digital otoacoustic signature of the individual. An example of a method by which a person's otoacoustic signal may be measured and digitized into a digital otoacoustic signature is given in Swabey, M., Beeby, S., Brown, A. and Chad, J., "Using Otoacoustic Emissions as a Biometric", in *Proceedings of First International Conference on Biometric Authentication (ICBA* 2004), pp. 600-606, Hong Kong. Zhang, D. and Jain, A. N., Eds., incorporated by reference herein.

Use of otoacoustic signatures in SIP authentication would provide reliable biometric authentication of multimedia services, in particular IP telephony services. Biometric authentication would allow authentication of an individual user rather than of a client device, which would provide for use of services supported by SIP by a registered user from any end user device.

SUMMARY OF THE INVENTION

In accordance with one aspect of the invention, a method of authenticating a caller requesting an SIP service through an SIP server is provided, the caller using an SIP client, is provided. At the SIP client, a digital otoacoustic signature of the caller is determined, and a client response is generated using the digital otoacoustic signature of the caller. The client response is sent to the SIP server. At the SIP server, an apparent caller is determined from a request for the SIP service. At the SIP server, an expected response is generated using a stored digital otoacoustic signature stored in association with the apparent caller. The client response is compared with the expected response, and if the expected response matches the client response then the caller is authenticated. The client response may be generated by applying a hash function using a nonce and the digital otoacoustic signature of the caller as inputs, and the expected response may be generated by applying the hash function using the nonce and the stored digital otoacoustic signature as inputs. The digital otoacoustic signature of the caller may be determined by transmitting a trigger signal through a speaker of an end user device, receiving a received signal through a microphone of the end user device, and generating the digital otoacoustic signature from the received signal.

In accordance with another aspect of the invention, an SIP client is provided. The SIP client includes an otoacoustic reader for reading a digital otoacoustic signature of a user, and an SIP module. The SIP module includes means for receiving the digital otoacoustic signature from the otoacoustic reader, means for generating a response using the digital otoacoustic signature, and means for sending the client response to an SIP server.

In accordance with another aspect of the invention, a method of authenticating a caller at an SIP server is provided. A stored digital otoacoustic signature is stored in association with an apparent caller. An expected response is generated using the stored digital otoacoustic signature. A client response is received from an SIP client attempting to establish a service connection. The client response is compared with the expected response, and if the client response matches the expected response then the caller is authenticated.

In accordance with another aspect of the invention, a method of authenticating a recipient of a call through an SIP server, the recipient using an SIP client, is provided. At the SIP client, a digital otoacoustic signature of the recipient is determined, and a client response is generated using the digital otoacoustic signature. The client response is sent to the SIP server. At the SIP server, an intended recipient is determined from a request for the call received from a caller, and an expected response is generated using a stored digital otoacoustic signature stored in association with the intended recipient. The client response is compared with the expected response, and if the caller is informed of the result of the comparison of the client response and the client response.

Apparatus are provided for carrying out the methods of the invention. The methods of the invention may be stored as processing instructions on computer-readable media.

The methods and apparatus of the present invention allow biometrics to be used to authenticate users of multimedia sessions over IP. The invention is particularly useful for Voice Over IP (VoIP) services, since IP telephones can be ergonomically equipped with otoacoustic readers which can operate almost imperceptibly to the user of the VoIP service. Comparing a value derived from the stored digital otoacoustic signature of the apparent caller with the digital otoacoustic signature of the user attempting to establish the service allows the SIP server to verify that the user is entitled to use the requested service.

BRIEF DESCRIPTION OF THE DRAWINGS

The features and advantages of the invention will become more apparent from the following detailed description of the preferred embodiment(s) with reference to the attached figures, wherein.

It will be noted that in the attached figures, like features bear similar labels.

DETAILED DESCRIPTION OF THE EMBODIMENT

Figure 1:
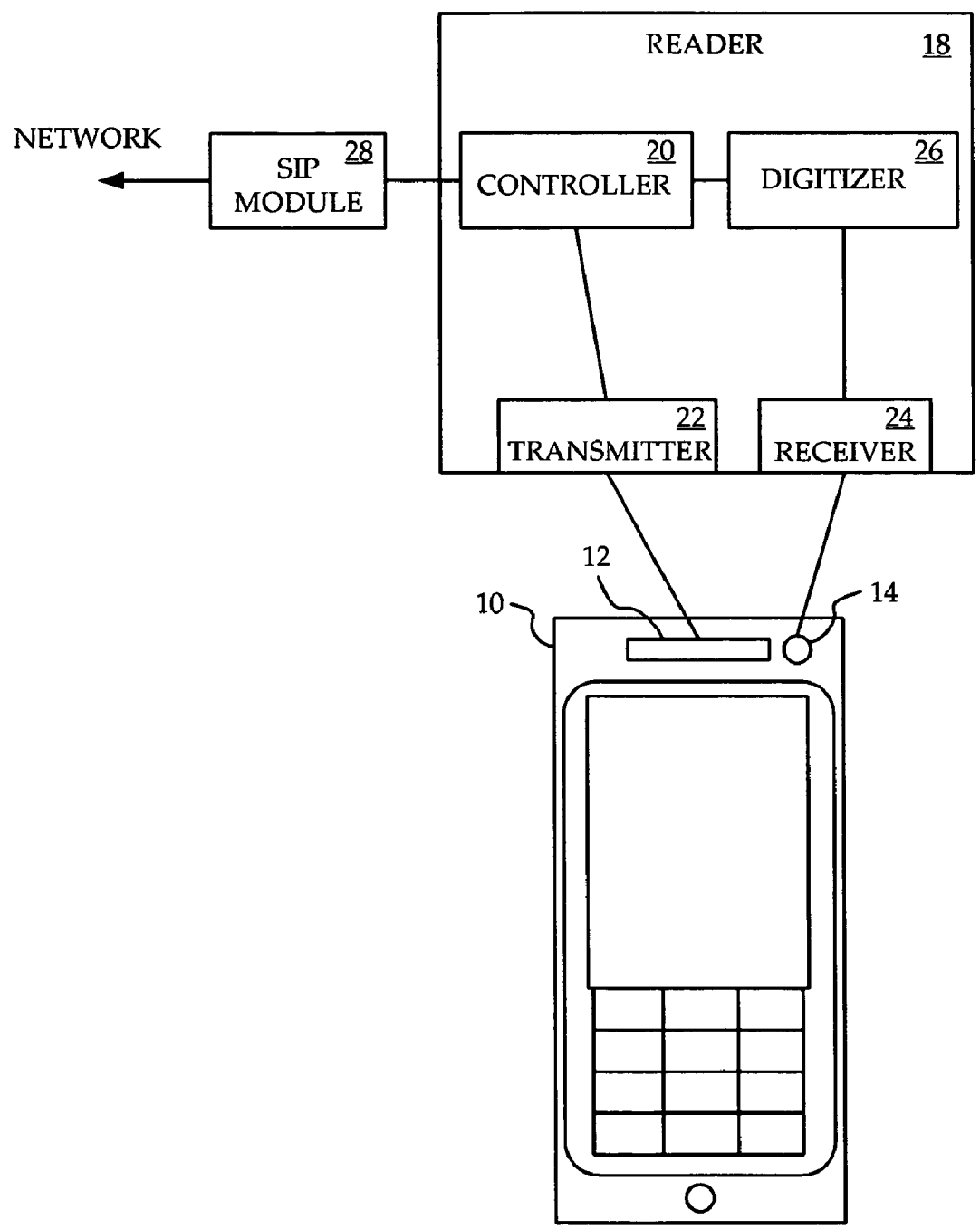
FIG. 1 is a diagram of an end user device according to one embodiment of the invention.

Referring to FIG. 1, an end user device 10 (in this example, an Internet-enabled telephone) according to one embodiment of the invention is shown. The end user device 10 includes a speaker 12, and an otoacoustic microphone 14 located next to the speaker 12. Ergonomically, the speaker 12 and the otoacoustic microphone 14 are located on the end user device 10 such that they can transmit sound into and detect sound from the ear canal of a user when the user holds the end user device 10 to his or her head in normal usage of the device. The otoacoustic microphone 14 is distinct from the microphone used to pick up the user's speech.

The end user device 10 includes an otoacoustic reader 18. The otoacoustic reader 18 is preferably in the form of software loaded as instructions into a processor within the end user device. Alternatively, the otoacoustic reader may be in the form of hardware, such as an integrated circuit, within the device. More generally, the otoacoustic reader contains logical instructions in the form of any combination of software or hardware. Logical instructions in the form of software may be stored on a computer-readable medium for loading into a processor within the device.

The otoacoustic reader 18 includes a controller 20, a transmitter 22, a receiver 24, and a digitizer 26. The transmitter 22 is preferably the transmitter used by other functionality of the end user device, such as transmission of a received communication signal to the speaker of a phone, but may alternatively be dedicated to the otoacoustic reader 18.

In operation, when prompted to do so (as explained below), the otoacoustic reader 18 determines a digital otoacoustic signature. The controller 20 generates a trigger signal which is transmitted through the speaker 12 via the transmitter 22. The otoacoustic reader 18 receives a received signal from the otoacoustic microphone 14 via the receiver 24. The digitizer 26 generates a digital otoacoustic signature from the received signal. Ideally, if the end user device 10 is held to the user's ear, then the received signal will be an echo resulting from transmission of the trigger signal into the user's ear canal, and the digital otoacoustic signature will be the digital otoacoustic signature of the user. If the end user device is not used properly, then the received signal will contain information unrelated to the ear canal of a user, and the digital otoacoustic signature generated by the digitizer 26 will be nonsense. The digitizer 26 passes the digital otoacoustic signature to the controller 20.

The end user device 10 also includes an SIP module 28, which allows the end user device 10 to act as an SIP client for interaction with an SIP server (not shown) over a network in accordance with SIP.

Broadly, a user subscribes to an authentication service running on an SIP server. The user provides his or her digital otoacoustic signature to the SIP server, which stores the digital otoacoustic signature for later use. When the user wishes to establish an SIP service, the SIP server requests the SIP client used by the user to provide authentication. The SIP client determines the digital otoacoustic signature of the user, determines a value from the digital otoacoustic signature, and provides the value to the SIP server. The SIP server compares the value provided by the SIP client with a value determined from the digital otoacoustic signature stored at the SIP server. If the two values match, meaning that the two digital otoacoustic signatures match, then the SIP server allows establishment of the SIP service.

Before using an SIP service that uses the authentication service of the invention, a user provides his or her digital otoacoustic signature to the SIP server providing access to the SIP service. When the user subscribes to the SIP service by providing user identification information to the SIP server, such as user identification, name, and address, the user also submits his or her digital otoacoustic signature. The user's digital otoacoustic signature may be provided to the SIP server in any manner, but if the user subscribes to the SIP service using the end user device 10 then preferably the SIP server prompts the SIP module 28 for the user's digital otoacoustic signature, whereupon the SIP module 28 requests the digital otoacoustic signature from the reader 18. The reader 18 determines a digital otoacoustic signature and passes this to the SIP module 28, which in turn passes the digital otoacoustic signature for storage at the SIP server. The SIP server stores the digital otoacoustic signature in association with the user identification information. If the user device 10 is used properly, that is held so that the speaker 12 and microphone 14 are next to the user's ear canal during reading of the digital otoacoustic signature, then the digital otoacoustic signature will be that of the user.

Figure 2:
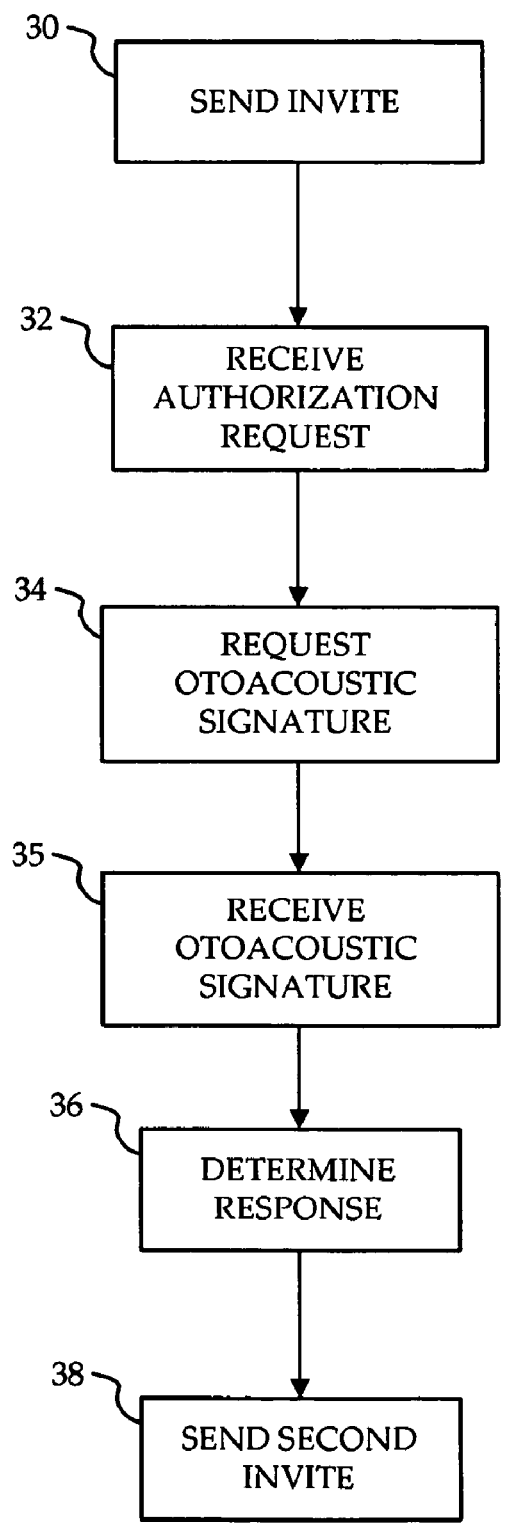
FIG. 2 is a flowchart of a method by which the end user device of FIG. 1 requests a service connection according to one embodiment of the invention.

Referring to FIG. 2, a flowchart of a method by which the SIP module 28 requests a service connection according to one embodiment of the invention is shown. At step 30 the SIP module 28 sends an Invite message over the network to an SIP server. At step 32 the SIP module 28 receives a message that requests authentication from the SIP server. In accordance with SIP, the message sent by the SIP server will include a nonce generated by the SIP server. At step 34 the SIP module requests a digital otoacoustic signature from the otoacoustic reader 18. The otoacoustic reader 18 determines a digital otoacoustic signature as described above, and at step 35 the SIP module 28 receives the digital otoacoustic signature.

At step 36 the SIP module 28 determines a client response to be included as part of a second Invite message. The SIP module 28 performs a hash function, using the nonce, the digital otoacoustic signature, and a message body as inputs to the hash function. The result of the hash function is the client response. At step 38 the SIP module 28 sends a second Invite message to the SIP server, the second Invite message including the nonce, the client response, and the message body.

Figure 3:
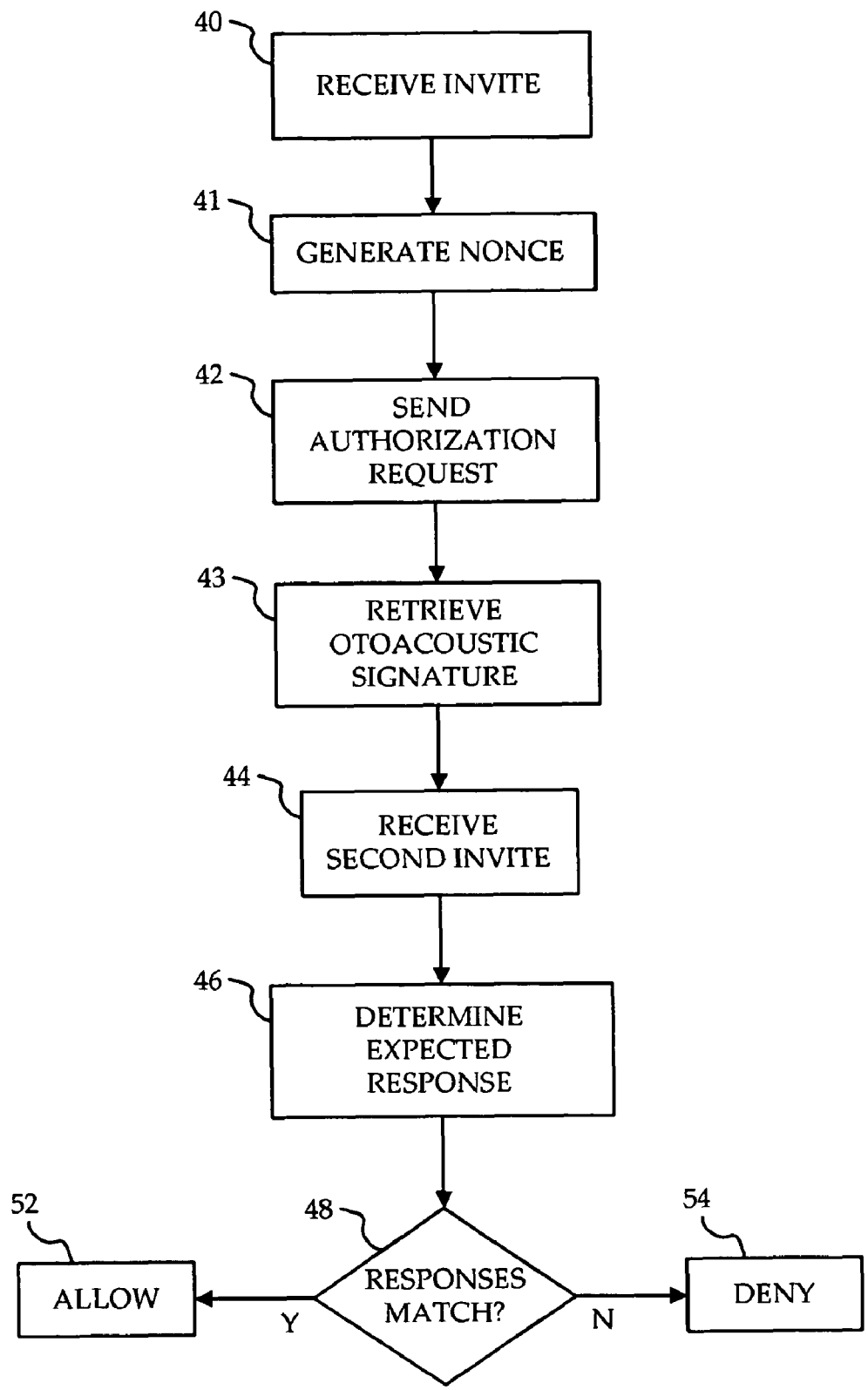
FIG. 3 is a flowchart of a method by which an SIP server accepts a service connection request according to one embodiment of the invention.

Referring to FIG. 3, a flowchart of a method by which an SIP server accepts a service connection request according to one embodiment of the invention is shown. At step 40 the SIP server receives an Invite message from an SIP client, such as the end user device 10 having the SIP module 28. At step 41 the SIP server generates a nonce. The exact contents of the nonce are not important and may be generated from a pseudorandom number generator, although the SIP server will make use of the nonce later. At step 42 the SIP server sends to the SIP client a message requesting authentication, embedding the nonce in the appropriate field of the message. The message may for example be in the form of a 407 Proxy Authorization Required message.

At step 43 the SIP server retrieves the stored digital otoacoustic signature of the apparent caller who sent the Invite message received at step 40. The apparent caller is identified from the Invite message as the user apparently making the service request. The stored digital otoacoustic signature is stored in association with the apparent caller upon registration of the caller with the authorization service, as described above.

At step 44 the SIP server receives a second Invite message from the SIP client. The SIP server extracts the client response embedded in the second Invite message, and at step 46 the SIP server determines an expected response. The SIP server determines the expected response by applying a hash function, using the nonce determined at step 41, the stored digital otoacoustic signature retrieved at step 43, and the message body of the second Invite message as inputs to the hash function. The hash function is the same as that used by the SIP module 28 at step 36 (described above) to determine the client response to be included in the second Invite message. At step 48 the SIP server compares the client response with the expected response determined at step 46 to determine whether the responses match. If the SIP server determines that the client response and the expected response match then at step 52 the SIP server allows establishment of the service requested by the SIP client. The expected response and the client response should match if the user of the end user device 10 requesting the service is the same user as subscribed to the authorization service, since the same hash function using the same inputs (the nonce, the digital otoacoustic signature of the user, and the message body) is being used to calculate each response.

If the SIP server determines at step 48 that the expected response does not match the client response, then the SIP server denies the service to the SIP client at step 54. This will usually occur if the user of the end user device is attempting to establish the service connection using someone else's identification information.

The invention may also be used to authenticate an intended recipient of a call. When an SIP server attempts to establish an SIP service with a recipient of a call, the SIP server challenges the recipient of the call to provide the digital otoacoustic signature of the recipient to the SIP server. The recipient has an end user device as described above with respect to FIG. 1, and the reader 18 of the recipient's end user device reads the digital otoacoustic signature of the recipient as described above. The SIP module 28 of the recipient's end user device generates a client response as described above, using a hash function taking the digital otoacoustic signature of the recipient and a nonce provided by the SIP server as inputs. The SIP module includes the client response within a response message to the SIP server's invitation to establish an SIP service. Upon receipt of this response message, the SIP server compares the client response generated by the recipient's SIP module with an expected response generated by the SIP server based on the stored digital otoacoustic signature of the intended recipient and the nonce. The SIP server informs the SIP module of the caller's end user device, possibly through other SIP servers or proxies, of the result of the comparison. This allows the caller to know whether the actual recipient of the call is the intended recipient of the call.

The invention has been described as using a hash function to generate the client response and the expected response. More generally, any function may be used to generate the client response and the expected response, as long as the same function is used by to generate both responses, and the function results in a high degree of correlation between the digital otoacoustic signature and the generated response. The invention has also been described as using the nonce, the digital otoacoustic signature, and the message body as inputs to the hash function. More generally, any inputs may be used to either the hash function or to whichever other function is used, as long as the digital otoacoustic signature is used as an input, either directly or indirectly. For example, the digital otoacoustic signature may be used as the seed of a random number generator, and the results of the random number generator used as the response or as one of the inputs to a hash function.

The invention has been described as using an IP telephone as an end user device. More generally any end user device may be used as an SIP client, as long as the SIP client includes an otoacoustic reader capable of determining a digital otoacoustic signature of a user. For example, a headset connected to a computer through which an IP telephone call is placed may be used. In such an example, the headset has a microphone adjacent the speaker which acts as the otoacoustic microphone 14. The reader 18 may comprise software on the computer with which the SIP module 28 of the computer communicates, or hardware on the soundcard or motherboard through which the computer communicates with the headset.

The SIP server may determine at some point whether a SIP client for a connection request supports digital otoacoustic signatures. For example, the initial Invite message from the SIP client may indicate that digital otoacoustic signatures are supported, in which case the method described above with reference to FIG. 3 is carried out. As another example, the SIP server may discover at step 43 that there is no digital otoacoustic signature stored in association with the caller, in which case the remainder of the steps are ignored and conventional authentication is carried out.

The logic of the method carried out by the SIP module, described above with respect to FIG. 2, and the logic of the method carried out by the SIP server, described above with reference to FIG. 3, is preferably in the form of software loaded as instructions into a processor within the SIP module or the SIP server. Alternatively, the logic may be in the form of hardware, such as an integrated circuit, within the respective device. More generally, the SIP module and the SIP server contain logical instructions in the form of any combination of software or hardware. Logical instructions in the form of software may be stored on a computer-readable medium for loading into a processor within the SIP module or the SIP server.

The invention has been described as using an SIP server to carry out the authentication by means of comparing an expected response, generated using a stored digital otoacoustic signature, and a client response, generated using a measured digital otoacoustic signature. Such authentication may also be carried out by an SIP proxy or by some other entity that understands SIP.

The embodiments presented are exemplary only and persons skilled in the art would appreciate that variations to the embodiments described above may be made without departing from the spirit of the invention. Methods which are logically equivalent to the methods described with reference to FIG. 2 and FIG. 3 may be used. For example, the step 43 of retrieving the digital otoacoustic signature may be carried out by the SIP server before sending to the SIP client the message requesting authentication. The scope of the invention is solely defined by the appended claims.

We claim:

1. A method of authenticating a caller requesting a Session Initiation Protocol (SIP) service through an SIP server, the caller using an SIP client, comprising:
    at the SIP client, determining a digital otoacoustic signature of the caller;
    at the SIP client, generating a client response using the digital otoacoustic signature of the caller as a seed of a random number generator;
    sending the client response to the SIP server;

at the SIP server, determining an apparent caller from a request for the SIP service;
at the SIP server, generating an expected response using a stored digital otoacoustic signature stored in association with the apparent caller as the seed of the random number generator;
at the SIP server, comparing the client response with the expected response; and
if the expected response matches the client response, authenticating the caller.

2. The method of claim 1, wherein generating the client response comprises:
applying a hash function using a nonce and the digital otoacoustic signature of the caller as inputs, and generating the expected response comprises:
applying the hash function using the nonce and the stored digital otoacoustic signature as inputs.

3. The method of claim 2, further comprising:
sending from the SIP server to the SIP client a message requesting authentication, the message including the nonce.

4. The method of claim 2, wherein generating the client response further comprises:
using a message body as an input to the hash function, and generating the expected response further comprises:
using the message body as an input to the hash function.

5. The method of claim 1, wherein determining the digital otoacoustic signature of the caller comprises:
transmitting a trigger signal through a speaker of an end user device;
receiving a received signal through a microphone of the end user device; and
generating the digital otoacoustic signature from the received signal.

6. The method of claim 5, further comprising:
producing the received signal by an echo of the trigger signal within an ear canal of the caller.

7. The method of claim 1, further comprising:
transmitting the stored digital otoacoustic signature to the SIP server before sending the client response to the SIP server.

8. The method of claim 7, further comprising:
generating the stored digital otoacoustic signature at the SIP client, wherein transmitting the stored digital otoacoustic signature to the SIP server occurs when the user subscribes to an authentication service with the SIP server.

9. The method of claim 8, wherein generating the stored digital otoacoustic signature at the SIP client further comprises:
transmitting a trigger signal through a speaker of an end user device;
receiving a received signal through a microphone of the end user device; and
generating the stored digital otoacoustic signature from the received signal.

10. An SIP client comprising:
an otoacoustic reader for reading a digital otoacoustic signature of a user; and
an SIP module comprising:
means for receiving the digital otoacoustic signature from the otoacoustic reader;
means for generating a client response using the digital otoacoustic signature as a seed of a random number generator; and
means for sending the client response to an SIP server, wherein the SIP server compares the client response with an expected response generated using a stored digital otoacoustic signature associated with an apparent caller as the seed of the random number generator and authenticates the user in the event that the client response matches the expected response.

11. The SIP client of claim 10, further comprising:
means for receiving a nonce from the SIP server, wherein the means for generating the client response further comprises:
means for applying a hash function using the nonce and the digital otoacoustic signature as inputs.

12. The SIP client of claim 11, wherein the means for generating the client response further comprises:
means for using a message body as an input to the hash function.

13. A method of authenticating a caller at an SIP server, comprising:
storing a stored digital otoacoustic signature in association with an apparent caller;
generating an expected response using the stored digital otoacoustic signature as a seed of a random number generator;
receiving a client response from an SIP client attempting to establish a service connection, wherein the SIP client generated the client response using a caller's digital otoacoustic signature as the seed of the random number generator;
comparing the client response with the expected response; and
authenticating the caller in the event that the client response matches the expected response.

14. The method of claim 13, further comprising:
sending a nonce to the SIP client, wherein generating an expected response further comprises:
applying a hash function using the stored digital otoacoustic signature and the nonce as inputs.

15. The method of claim 14, wherein generating the expected response further comprises:
using a message body as an input to the hash function.

16. A method of authenticating a recipient of a call through an SIP server, the recipient using an SIP client, comprising:
at the SIP client, determining a digital otoacoustic signature of the recipient;
at the SIP client, generating a client response using the digital otoacoustic signature as a seed of a random number generator;
sending the client response to the SIP server;
at the SIP server, determining an intended recipient from a request for the call received from a caller;
at the SIP server, generating an expected response using a stored digital otoacoustic signature stored in association with the intended recipient as the seed of the random number generator;
at the SIP server, comparing the client response with the expected response; and
informing the caller of the result of the comparison of the expected response and the client response.

17. The method of claim 16, wherein generating the client response further comprises:
applying a hash function using a nonce and the digital otoacoustic signature as inputs, and generating the expected response further comprises:
applying the hash function using the nonce and the stored digital otoacoustic signature as inputs.

18. The method of claim 17, further comprising:
generating the nonce at the SIP server; and
sending the nonce from the SIP server to the SIP client.

19. The method of claim 16, wherein determining the digital otoacoustic signature of the recipient further comprises:
   transmitting a trigger signal through a speaker of an end user device;
   receiving a received signal through a microphone of the end user device; and
   generating the digital otoacoustic signature from the received signal.

20. The method of claim 1, wherein the expected response allows authentication of an individual user.

* * * * *